Figure 1:
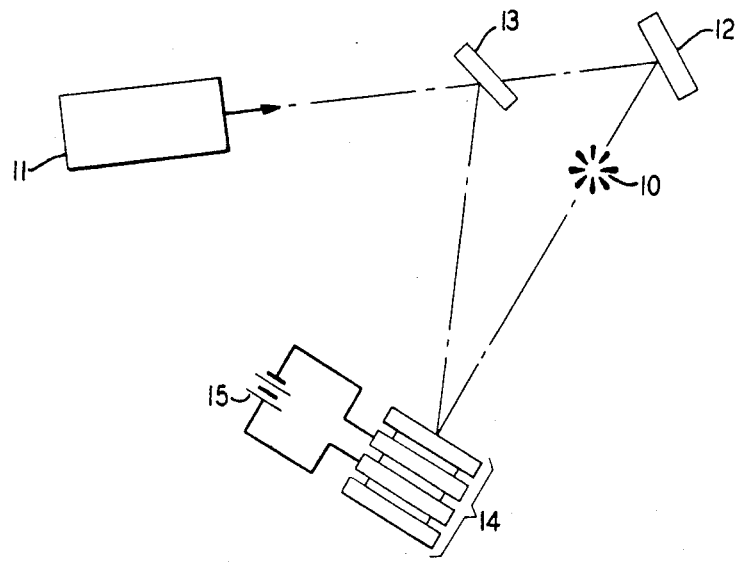

[11] 3,623,787

| | |
|---|---|
| [72] Inventor | Raymond E. Straile<br>New Providence, N.J. |
| [21] Appl. No. | 795,165 |
| [22] Filed | Jan. 30, 1969 |
| [45] Patented | Nov. 30, 1971 |
| [73] Assignee | Bell Telephone Laboratories, Incorporated<br>Murray Hill, N.J. |

[54] HOLOGRAPHIC SYSTEM
1 Claim, 2 Drawing Figs.

[52] U.S. Cl. .................................................. 350/3.5,
204/15
[51] Int. Cl. .............................................. G02b 27/22
[50] Field of Search .......................................... 350/3.5,
150; 340/173; 346/135

[56] References Cited
UNITED STATES PATENTS
3,404,073  10/1968  Scott .................... 204/15
OTHER REFERENCES
Leith et al., Scientific American, Vol. 212 No. 6 pp. 24–35 (6/1965).

*Primary Examiner*—David Schonberg
*Assistant Examiner*—Robert L. Sherman
*Attorneys*—R. J. Guenther and Arthur J. Torsiglieri

ABSTRACT: The specification describes a holographic recording system employing, as the recording medium, a photoconductive semiconductor.

PATENTED NOV 30 1971

3,623,787

INVENTOR
R. E. STRAILE
BY
ATTORNEY

HOLOGRAPHIC SYSTEM

This invention relates to the storage of optical information in the form of holograms. More specifically it relates to storage media for holographic images.

One of the many consequences of the discovery of the laser is the emergence of holography as a practical method for storing and retrieving optical information. The fundamentals of holography are now well known and have been described by Leith et al. in "Scientific American," Vol. 212, No. 6, pp. 24–35, June 1965, and by Stroke, "Introduction to Coherent Optics and Holography," Academic Press, 1966. Much attention has been directed to the mechanics of recording and displaying optical images. However, significant, if not equal, interest should be devoted to the storage media for the holograms. Just as great advances in photography have been made possible by improved film it might be expected that new holographic media will produce impressive advances in holography.

This invention is directed to new and unique systems for holographic information storage and involves the application of electrochemical techniques for storing optical images in a unique storage medium. The medium consists of a thin film, 1,000 A–5,000 A, of cadmium sulfide or lead sulfide incorporated as the anode of an electrolytic cell. The electrolyte is sodium or potassium cyanide. The image is focused onto the photoconductive film and a potential applied. The regions of the film exposed to light are rendered conductive and the anode reaction converts the cadmium or lead sulfide to a soluble cyanide complex. As the soluble cyanide compound dissolves a phase-type hologram is formed.

Figure 2:
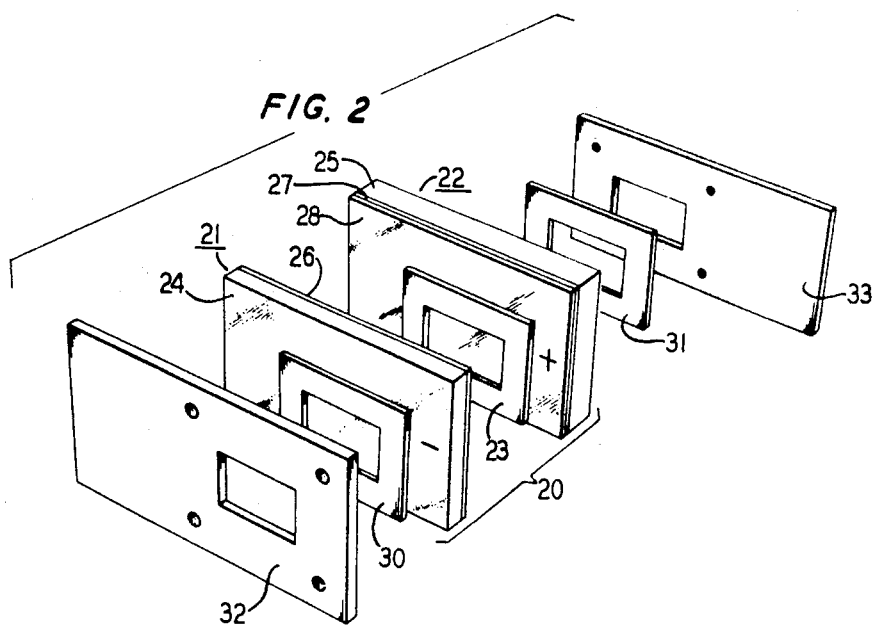

The formation of optical images in these novel recording media will be set forth in greater detail in the following specific description. In the drawing:

FIG. 1 is a schematic representation of a hologram system useful for creating the optical image; and FIG. 2 is a perspective view of the recording cell with the various components separated for clarity in viewing.

In FIG. 1 the information to be recorded is shown at 10. The subject is illuminated by a coherent light source 11 reflecting from mirror 12. A portion of the source beam, constituting the reference beam, is split off by beam splitter 13. The information beam and the reference beam are joined at an angle to one another to form an interference pattern on the recording cell at 14. The recording cell is usually biased by DC source 15.

The recording cell, upon which this invention is based, is shown in FIG. 2. The elements are shown in exploded view for clarity. The active portion of the cell comprises two electrodes 21 and 22, and an inert spacing element 23. The spacing element is incidental and is merely a frame of silicone rubber or other inert substance which acts in this construction as a separator and electrical insulator. The electrodes comprise glass plates 24 and 25 each coated on the active side with an electrically conductive, transparent material, 26 and 27, such as tin oxide, antimony oxide or mixtures of these oxides. It is not essential that the anode plate be transparent; but both plates are shown here as transparent for convenience in aligning the optical image and to facilitate real time observation and monitoring of the recorded signal within the recording medium. The anode plate has an additional coating, 28, of cadmium sulfide or lead sulfide. This coating has a thickness in the range of 1,000 A–5,000 A. The cell assembly is completed by spacers 30 and 31 and end plates 32 and 33 all of which have windows to accommodate the image beam. When assembled under compression the cell constitutes a self-contained recording unit with an indefinite shelf life; the electrolyte being added a short time prior to use. Many different cell types and configurations are possible; the above described system being only one of these possibilities is not intended to be restrictive. The electrolyte is sodium or potassium cyanide in concentrations of 0.1 N to 1.0 N. Equivalent electrolytes in the form of gels or pastes may also be useful.

To demonstrate the usefulness of this invention holographic diffraction patterns one-eighth inch in diameter were produced in recording cells constructed as described above. The windows were one inch by one-eighth inch and the interelectrode spacing was one-eighth inch.

A capacitive discharge of $90 \times 10^{-3}$ coulombs at $4.5\mu$ and laser beam power of 265 microwatts cm.$^{-2}$ produced a simple holographic diffraction grating having a line spacing of $1.5\mu$, which had a diffraction power of 0.7 percent of a theoretical maximum of 33 percent. Such diffracted power, while seeming quite low, is quite capable of activating many detectors. Other operating conditions (e.g., continuous power for 5 minutes at 0.25 volts) have resulted in similar gratings having diffraction efficiencies of 30 percent of theoretical. Good results were obtained using NaCN electrolytes at normalities of 0.25, 0.5 and 1.0. A voltage of 1 (½) volts was used in most cases although the photovoltaic effect of this cell is sufficient to record the image if the exposure is sufficiently long.

What is claimed is:

1. A holographic system comprising a coherent light source for illuminating the object of which the holographic image is to be made, means for superimposing a coherent light reference beam onto a light beam emanating from the aforementioned object and recording means for detecting the holographic image resulting from the superposition of the said light beams the improvement comprising the provision of a photolytic cell as the recording means said cell comprising an anode having a thin layer of lead sulfide or cadmium sulfide immersed in an electrolyte comprising a solution of 0.1 N to 1.0 N NaCN or KCN and means for biasing the thin layer as anode while the holographic light image is incident thereon.

* * * * *